(12) United States Patent
Nagarkar et al.

(10) Patent No.: US 9,377,542 B1
(45) Date of Patent: Jun. 28, 2016

(54) RADIATION SENSOR HAVING PHOTONIC CRYSTAL STRUCTURE AND FABRICATION METHOD THEREOF

(71) Applicants: Vivek V. Nagarkar, Weston, MA (US); Bipin Singh, Watertown, MA (US); Hamid Sabet, Watertown, MA (US); Jules Gardener, Watertown, MA (US)

(72) Inventors: Vivek V. Nagarkar, Weston, MA (US); Bipin Singh, Watertown, MA (US); Hamid Sabet, Watertown, MA (US); Jules Gardener, Watertown, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 14/850,209

(22) Filed: Sep. 10, 2015

Related U.S. Application Data

(60) Provisional application No. 62/052,234, filed on Sep. 18, 2014.

(51) Int. Cl.
*G01T 1/202* (2006.01)
(52) U.S. Cl.
CPC ...................................... *G01T 1/202* (2013.01)
(58) Field of Classification Search
CPC ..... G01T 1/2002; G01T 1/1644; G01T 1/202; G01T 3/06; G01T 1/20; G01T 1/2018; G01T 1/201; G01T 1/2985; G01T 5/02; G01T 1/2006; G01T 1/22
See application file for complete search history.

(56) References Cited

U.S. PATENT DOCUMENTS

| | | | | |
|---|---|---|---|---|
| 2005/0089140 A1* | 4/2005 | Mario | ................. | G01N 23/046 378/57 |
| 2010/0034353 A1* | 2/2010 | Kravis | ................. | G01V 5/0025 378/87 |
| 2012/0201346 A1* | 8/2012 | Cao | ........................ | G01T 1/2002 378/53 |
| 2013/0075718 A1* | 3/2013 | Nause | ....................... | G01T 3/06 257/43 |
| 2014/0084174 A1* | 3/2014 | Torres | ..................... | G01T 1/202 250/368 |
| 2014/0110591 A1* | 4/2014 | Reboud | ................. | G01T 1/2002 250/366 |

\* cited by examiner

*Primary Examiner* — Marcus Taningco
(74) *Attorney, Agent, or Firm* — Burns & Levinson LLP; Orlando Lopez

(57) ABSTRACT

A radiation sensor and a fabrication method thereof are described. In one aspect, the radiation sensor comprises a photo detector, a scintillator on the photo detector, and an adiabatic gradient-index photonic crystal nanostructure between the scintillator and the photo detector. In one instance, the adiabatic gradient-index photonic crystal nanostructure comprises an impedance matching nanostructure. In another instance, the adiabatic gradient-index photonic crystal nanostructure comprises a plurality of nanocones.

8 Claims, 7 Drawing Sheets

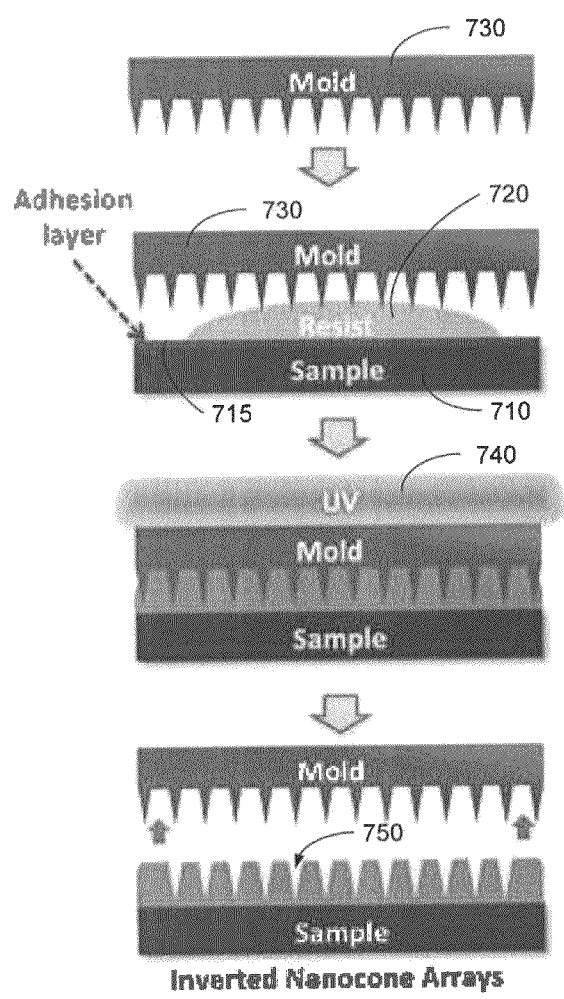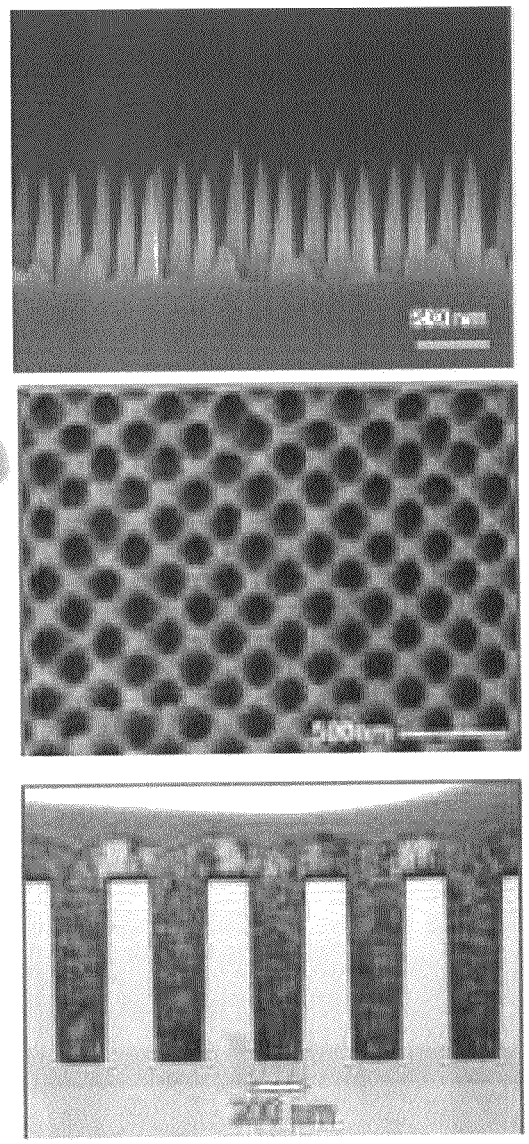
FIG. 7A
FIG. 7B

RADIATION SENSOR HAVING PHOTONIC CRYSTAL STRUCTURE AND FABRICATION METHOD THEREOF

CROSS REFERENCE TO RELATED APPLICATIONS

This application claims priority to and benefit of U.S. Provisional Application No. 62/052,234, entitled RADIATION SENSOR HAVING PHOTONIC CRYSTAL STRUCTURE AND FABRICATION METHOD THEREOF, filed on Sep. 18, 2014, which is incorporated by reference herein in its entirety and for all purposes.

BACKGROUND

The present teachings relate to a radiation sensor including a photonic crystal structure and a method for fabricating the same. More particularly, the present teachings relate to a radiation sensor including a photonic crystal structure with improved transmission at a dielectric interface of the radiation sensor, and a method for fabricating the same.

Presently, two approaches are available to achieve improved transmission at a dielectric interface of a radiation sensor at the scintillator-photodetector boundary: (i) multi-layer coatings; and (ii) adiabatic transition in dielectric index.

Although multi-layer coatings (MLCs) are the standard approach, the bandwidth and range of angles over which transmission is improved depend on the number of layers and the precision in achieving the specified layer thicknesses. For moderate specifications, MLCs work quite well. For high-end applications where transmission must increase by large amounts over large bandwidths and angles of acceptance ("Omni-directional"), however, the manufacturing constraints and cost become prohibitive.

An alternative to MLCs is the use of a single layer whose effective index of refraction is specified by periodic "drilling" of subwavelength holes in a high-index medium substrate. Because the holes are smaller than the wavelength, they do not diffract or otherwise affect light transmission. The holes, however, reduce the effective index to a value much lower than that of the substrate.

Moreover, when a scintillator is coupled to a photodetector with a lower RI window, the light generated by the interaction of a γ-ray in the scintillator undergoes multiple total internal reflections and losses before exiting to the photodetector, limiting the light available for detection to only 30% of the total. This loss of signal degrades the energy resolution. The multiple total internal reflections in the scintillator also delay the exit of scintillation photons towards the photodetector, causing substantial degradation in timing resolution.

SUMMARY

In view of the above and other drawbacks, the present teachings provide a high refractive index (RI) scintillation radiation sensor that demonstrates a fundamental and transformational leap in the performance of current state-of-the-art. The radiation sensor of the present teachings employ the super-transmissivity properties of nanostructured photonic crystal (PhC) surfaces.

Major gains in the detector's energy and timing resolution can be accomplished by implementing methodologies that simultaneously allow effective utilization of the remaining 70% of the light, and redistribution of light propagation modes within the scintillation crystal that enable fast extraction of photons, thereby leading to substantial enhancements in the system sensitivity, and spatial and temporal resolution. In one embodiment, adiabatic gradient-index PhC nanostructures (GRIN), which are a generalization of the PhC concept, can be used to realize high sensitivity, high performance detectors, using existing scintillation materials.

In accordance with one aspect, the present teachings provide a radiation sensor, comprising a photo detector, a scintillator on the photo detector, and an adiabatic gradient index lens structure between the scintillator and the photo detector. In one embodiment, the adiabatic gradient index lens structure comprises an impedence matching nanostructure. In one embodiment, the adiabatic gradient index lens structure comprises tapered structures, such as nanocones.

In accordance with another aspect, the present teachings provide a method for fabricating a radiation sensor. The method comprise fabricating a scintillator having an adiabatic gradient index lens structure, and combining the scintillator with a photodetector, the adiabatic gradient index lens structure of the scintillator facing the photodetector. In one embodiment, fabricating a scintillator comprises providing a scintillator substrate comprising a substrate, a first hardmask layer on the substrate, a second hardmask layer on the first hardmask layer, and a photoresist layer on the second hardmask material; patterning the photoresist layer to form a nanoscale pattern; etching the first hardmask layer using the nanoscale pattern of the photoresist layer to form a first hardmask pattern; etching the second hardmask layer using the first hardmask pattern to form a second hardmask pattern; and simultaneously etching the second hardmask pattern and the substrate to form the adiabatic gradient index lens structure on the substrate. In one embodiment, an etching rate of the second hardmask pattern is much slower than that of the substrate.

BRIEF DESCRIPTION OF THE DRAWINGS

For a better understanding of the present teachings, reference is made to the accompanying drawings and detailed description and its scope will be pointed out in the appended claims.

FIG. 7A illustrates a fabrication process of nanohole arrays with transparent photo curable polymer, in accordance with an embodiment of the present teachings.

FIG. 7B illustrates scanning electron micrographs of a mold (top), an array of replicated inverted nanocone structures (middle), and CVD filled nanoholes (bottom).

DETAILED DESCRIPTION

The present teachings provide a radiation sensor, comprising a photo detector, a scintillator on the photo detector, and an adiabatic gradient index lens structure between the scintillator and the photo detector. By judiciously designing the shape and periodicity of the adiabatic gradient index lens structure, effective index matching can be achieved. In a way, this adiabatic gradient index lens structure can be thought of as photonic crystals (PhCs), which contain regularly repeating regions of high and low dielectric constant.

The wavelength of a light beam determines whether or not the light beam (or photons behaving as waves) propagates through this structure. Wavelengths that are allowed to travel are known as modes. Groups of allowed modes form bands. Disallowed bands of wavelengths are called photonic band gaps. This gives rise to distinct optical phenomena, such as inhibition of spontaneous emission, high-reflecting omni-directional mirrors and low-loss-waveguides. In one embodiment, the PhC is designed such that the light at the operating wavelengths is in the passband, and it is coupled into a free-space mode (whereas in most of the literature, PhCs are designed to operate in bound modes, or "defect modes," such as waveguides and cavities.)

Adiabatic transition is a generalization of the PhC concept. Similar to PhCs, it requires the use of periodic subwavelength structures with periods that are significantly smaller than half a wavelength, e.g., about 200 nm (for blue) to 350 nm (for red) for transmission in the visible part of the spectrum. Unlike PhCs, however, in the adiabatic design the shape of the periodic structures is variant along the perpendicular direction to the interface. The variant shape is designed so as to result in an effective gradient index of refraction that varies gradually between the indices of the two surrounding media, thus eliminating reflection. Such structures are referred to as adiabatic gradient-index PhC nanostructures or simply, hereinafter referred to herein as GRINs.

The index-matching of GRINs in the form of nanocones may efficiently transfer scintillation light to the underlying photodetector, in spite of large RI mismatch at the scintillator-photodetector window interface. The increased light transfer efficiency leads to substantial improvements in the timing and energy resolution, and spatial resolution in the case of imaging detectors. The GRINs are carefully designed to match the peak emissions of scintillators, and implemented directly onto the scintillator surface or in a suitable membrane. The membrane can then be applied as a medium to efficiently transfer scintillation photons to the underlying photodetector.

Figure 1:
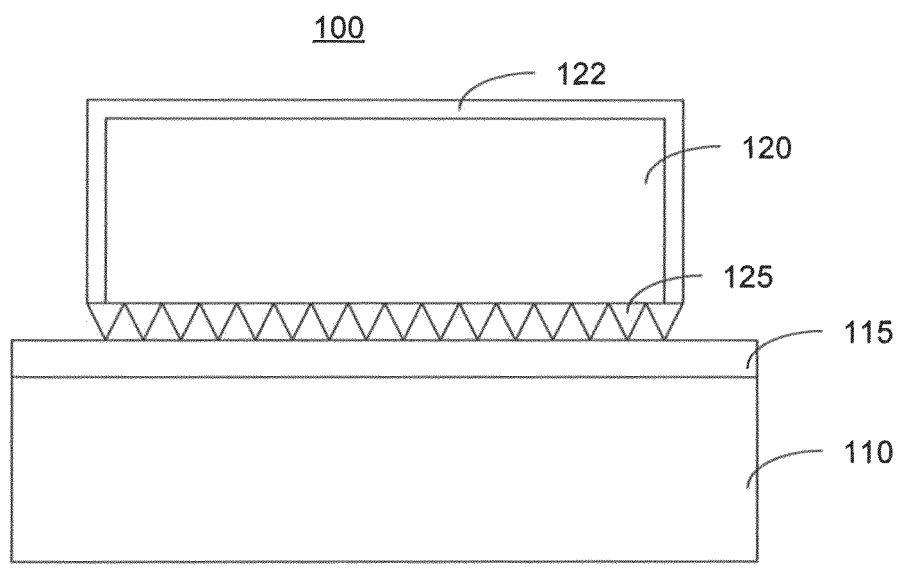
FIG. 1 schematically illustrates a radiation sensor comprising nanocones in accordance with one embodiment of the present teachings.

FIG. 1 schematically illustrates a radiation sensor comprising nanocones in accordance with one embodiment of the present teachings. As shown in FIG. 1, radiation sensor 100 comprises a photodetector 110, a scintillator 120, and an impedance matching nanostructure 125 between photodetector 110 and scintillator 120. In one embodiment, impedance matching nanostructure 125 comprises nanocones. In one embodiment, a transparent protective layer 115 is formed on photodetector 110 and in contact with to nanostructure 125 to serve as an optical window. In one embodiment, a reflective layer 122 is formed on surfaces of scintillator 120 other than that of the nanostructure 125, so as to protect scintillator 120 and to reflect light generated from scintillator 120.

The GRIN of the present teachings includes substantial enhancements in energy and timing resolution that can be achieved using existing scintillators, making their performance comparable to, or even exceeding in some respects, the state-of-the-art, cooled, semiconductor sensors. Both these parameters are influenced by the statistical fluctuations of the number of photoelectrons ($N_{pe}$) registered in the photodetector following scintillation events in the crystal. The $N_{pe}$ is expressed as: $N_{pe}=q_{eff} \cdot LY = q_{eff} \cdot \eta_L \cdot LY_{abs}$, where $q_{eff}$ is the effective quantum efficiency of the photodetector, LY is the light yield of the scintillator, and $LY_{abs}$ is the absolute light yield of the scintillator. The light collection efficiency $\eta_L = LY/LY_{abs}$ represents the impact of all processes that lead to losses during transport of scintillation photons from the emission site to the active region of the photodetector. These include absorption and scattering in the crystal bulk, absorption and diffusion at crystal-reflector boundaries, and losses due to the mismatch of the refractive indices of the scintillator, optical coupling, and photodetector. The mismatch of the refractive indices is responsible for a large fraction of the overall light loss, and is a primary cause of increased statistical fluctuations of the light output and, therefore, deterioration of energy and timing resolution. The GRIN structures of the present teachings address this issue, providing: 100% to 150% gain in light collection efficiency; 40% to 60% improvement in energy resolution; and 30 to 35% improvement in timing resolution.

For instance, implementation of well-designed GRIN improves performance of a LaBr3:Ce crystal that confers 3% energy resolution at 662 keV. Taking into account the intrinsic resolution of LaBr3:Ce (arising from non-proportionality), the overall energy resolution after processing is around 2.2% (FWHM), thereby approaching the resolution exhibited by some of the state-of-the-art semiconductor sensors. The corresponding gain in coincidence timing resolution may be from current 400 ps to 260 ps, thus allowing realization of the full potential of such important imaging modalities as the four dimensional time-of-flight PET systems. The effects are even more dramatic for low light yield (LY) but highly linear performance scintillators such as CLYC, that have demonstrated ~3% energy resolution in spite of their low light yield of 20,000 ph/WV for γ interactions. In this case, not only energy and timing resolutions will be positively impacted, but also electron equivalent energy (EEE) for thermal neutron interactions can be enhanced, thus improving neutron spectroscopic resolution and n-γ pulse height discrimination.

The radiation sensor of the present teachings overcomes the problem of total internal reflection at the scintillator-photodetector interface by means of adiabatic GRINS, i.e., media with a gradient modulation of the index of refraction (equivalently, the dielectric constant). The gradient index structures are fabricated such that they adiabatically match the impedance of the scintillator to that of the detector, thereby drastically reducing reflection over a broad band of colors and incidence angles. The nanocone structures are similar to the moth-eye design, superior anti-reflectivity properties of which are mainly due to an axially varying effective refractive index of the tapered sub-wavelength structures. The gradient index of moth-eye structures can suppress Fresnel reflections, which are induced by abrupt index discontinuity between two different media.

Finite-difference time-domain (FDTD) calculations demonstrate drastically reduced reflection and enhanced transmission of nanostructured surface with nanocone square arrays of both conventional moth-eye and inverted nanocone structures. The calculations further show that as the aspect ratio (height to period ratio) of the nanocone structure is increased, reflections are reduced and transmission is enhanced due to gradual adiabatic transition of the effective refractive index. When the aspect ratio is ~3, reflections are suppressed to less than 1% and the transmission is greater than 99% over a broadband of wavelengths from 330 nm to 1800 nm, and over a wide range of incidence angles for a structure with 200 nm period. Thus, high aspect ratio nanostructures are implemented in a high index medium.

Similar to the conventional moth eye-like conical structures, the inverted nanocone structures are also effective in gradually varying reflective index, as the fill factor of the structure to air increases continuously along the optical axis of normally incident light. The inverted nanocone arrays, therefore, eliminate the abrupt difference in refractive indices due to the adiabatic impedance matching between material surfaces, and, hence, suppress reflections and promote transmissions. Thus, the proposed nanocone and inverted nanocone structures are well suited to address the current scintillator-photodetector coupling issues.

It should be noted that the same procedures used to implement nanocone structures can be used to create square stud or hole patterns (commonly known as PhCs in the literature). Thus, the fabrication technique for implementing large area GRINs is universal, and can be used to create structures most suitable for ultimate use. The GRINs are designed to match the peak emissions of scintillators, and implemented directly onto the scintillator surface or in a suitable membrane. The nanoimprinting technique may be used to create large area GRINs in an appliqué form. One benefit of the GRIN structure is its super-transmissivity over a wide range of wavelengths, which is critical for optimization of the light collection efficiency of scintillators that characteristically demonstrate emissions in a band around the peak wavelength.

1. Modeling and Simulation of Grin

The light collection efficiency (LCE) of a scintillation detector that contains a scintillator with a GRIN coupling face is mainly governed by three parameters: 1) the angular distribution of the scintillation photons incident on the coupling interface; 2) the dependence of the GRIN transmission on the angle of photon incidence; and 3) the probability that a photon reflected back into the bulk crystal reappears at the interface.

Moreover, the fact that scintillation photons are not emitted at a single wavelength, but over a range of wavelengths due to the broadening of the electronic states by the crystal field, needs to be taken into account. This implies that an optimization of the LCE can be achieved if the transmission of the GRIN slab is sufficiently high over the whole emission range of the scintillator. Therefore, the simulation of grin follows two steps: 1) determining angular distribution of the photons arriving at the exit surface of the scintillator, and 2) transmission at the GRIN exit surface as a function of its design.

Step 1: The light propagation from the emission source to the coupling face to the photodetector is analyzed using a light ray-tracing program (e.g., LITRANI, a general purpose Monte-Carlo program simulating light propagation in isotropic or anisotropic media) in the bulk of the scintillation crystal. The properties of the crystal, such as photo absorption and Compton scattering coefficients, can be taken from the NIST database (http://www.nist.gov/pml/data/xray_gammaray-.cfm) and from laboratory measurements. This program produces a file with the spatial, temporal, and angular distribution of the photons impinging on the extraction face of the crystal, where the GRIN structure is applied.

Step 2: The data from Step 1 is used as input to a Rigorous Coupled Wave Analysis (RCWA) code called CAMFR (CAvity Modeling FRamework) which is a common tool for electromagnetic study of nanoscaled gratings in multilayer structures. This software is based on an eigenmode expansion algorithm and works for one or two dimensional photonic crystal gratings.

Figure 2:
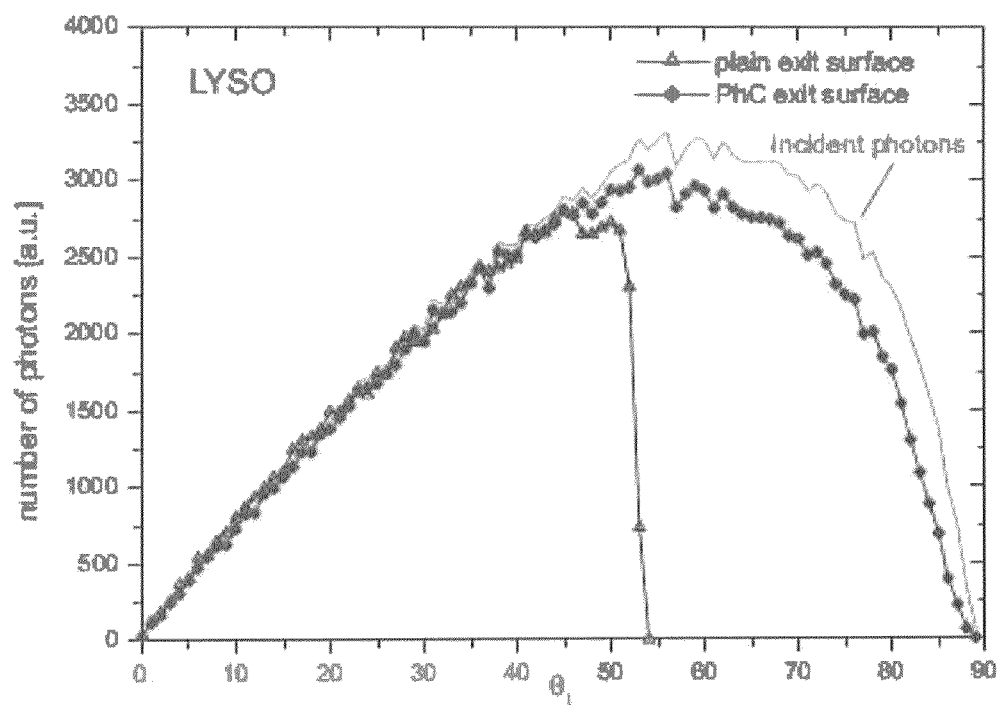
FIG. 2 illustrates the angular distribution of all photons extracted from an LYSO scintillator with and without PhC exit surface for $a/\lambda=0.8$.

Thus, the combination of LITRANI and CAMFR is used to determine ideal photonic crystal designs for different scintillators, such as LYSO, NaI:Tl, BGO, LaBr3:Ce, and CeBr3, and new dual mode n-γ scintillators, such as CLYC. In one case, the angular distribution of photons arriving at the exit surface of a 2×2×8 mm$^3$ LYSO scintillator is modeled. FIG. 2 summarizes the results with the total incident photons shown by the gray curve. FIG. 2 also shows a comparison of the predicted angular distribution of the photons that are extracted at the PhC coupling face (red curve, marked with prisms) with the angular distribution of the photons extracted from a crystal with plain exit surface (blue curve, marked with triangles). It should be noted that a large fraction of photons, which otherwise are lost, are efficiently collected by the nano-patterned exit surface yielding the desired gains in LCE.

The simulation framework can be adopted for 3-dimensional nano structures, such as GRIN. One approach is to mimic the GRIN structure by a multilayer system of 2-dimensional patterns to reproduce the conical shape. The CAMFR program may alternatively be replaced with a Finite Diffusion Time Domain (FDTD). The FDTD approach, although slower and requiring more computing power, can directly model 3-dimensional structures.

2. Fabrication of the Index Matching Structures.

For implementing nanostructures on scintillators, it is essential that the fabrication process is amenable to manufacturing. In some embodiments, e-beam lithography, dry etching with colloidal crystal mask or laser interference lithography, may be used, but may not the most economical choice nor most suitable for scale up. In one embodiment, a UV replication method is used to allow production of sash-wavelength three dimensional nanostructures over a large area with high throughput. Fabrication of the GRIN structures using this technique involves the creation of nanostructured template(s) for large area nanoimprinting, followed by a replication process to create large scale replicas of the structures from the master nanostructures. This UV replication method may be integrated with existing nano-lithography facilities. In one embodiment, the GRIN structures may be 1×1 cm$^2$ in size. Larger GRIN structures, such as 5×5 cm$^2$ or larger, may also be produced.

Fabrication of a template for nanoimprinting large area GRINs

Pre-designed master GRIN patterns may be fabricated for use in mass replication. The process is based on multiple-step plasma etching using shrinking masks for better control of the height and profile of nanocylinder (PhC) and nanocone (GRIN) structures. The GRIN fabrication requires particular attention, as creating nanocones requires extra processing steps as compared with nanocylinders (PhC).

Figure 3:
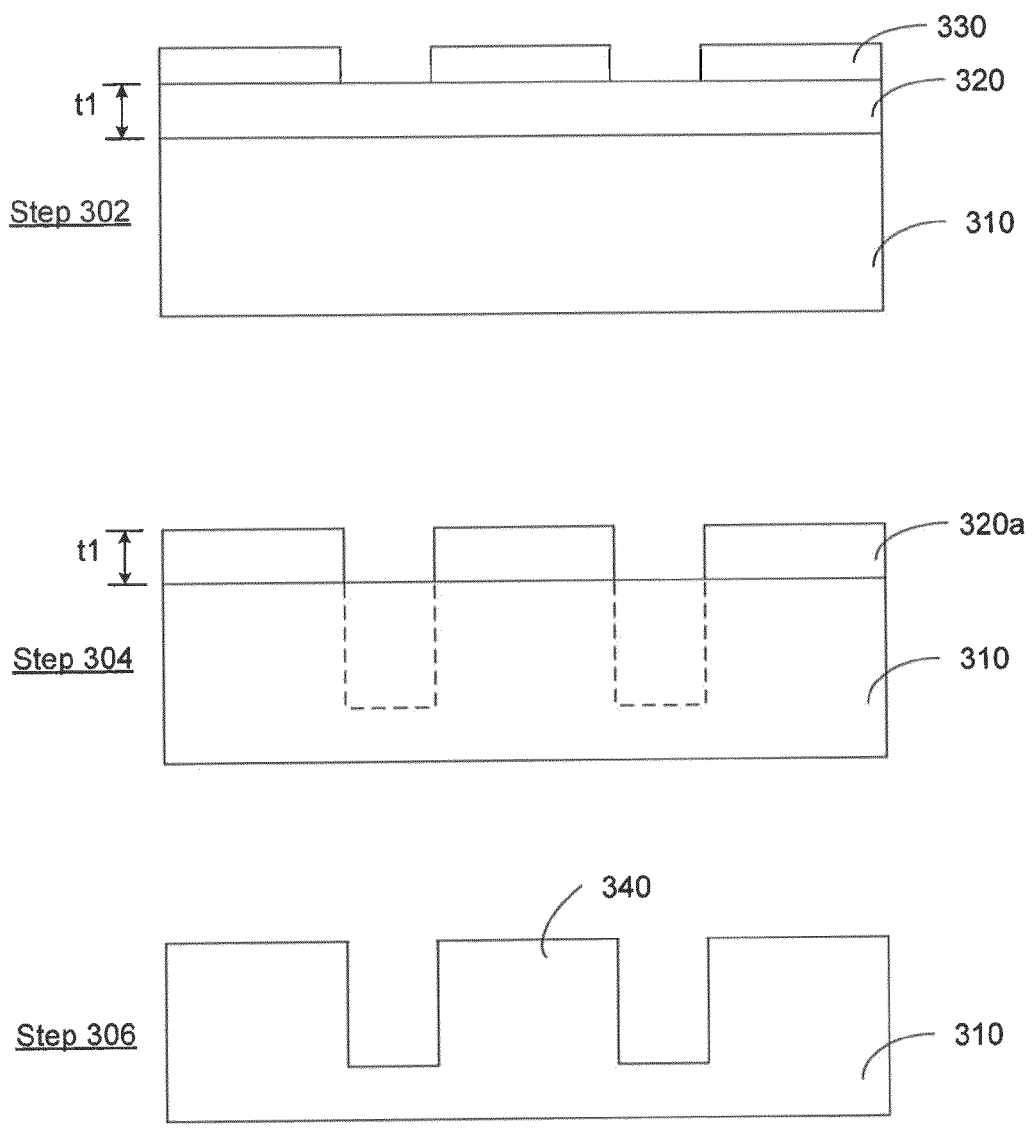
FIG. 3 schematically illustrates an etching process using a single hardmask, in accordance with an embodiment of the present teachings.

FIG. 3 illustrates an exemplary method of fabricating tapered nanocone structures using reactive ion etching (colloidal lithography) based on a single hardmask. As shown in FIG. 3, a hardmask material 320 is formed on a substrate 310, and a photo resist layer 330 is formed on hardmask material 320. In Step 302, photo resist layer 330 is patterned on hardmask material 320. In Step 304, hardmask material 320 is patterned in accordance with photoresist pattern 330 using reactive ion etching, so as to form a hardmask 320a, and then photoresist pattern 330 is removed. In Step 306, substrate 310 is then etched in accordance with hardmask 320a to form nanocones 340, and then hardmask 320a is removed. Both the thickness (t1) of hardmask 320a, and the etch selectivity between hardmask 320a and substrate 310 determines height of nanocones 340, and hence the aspect ratio of the resulting structures. While relatively straightforward, these processes are limited to the etch rate and thickness of a single hardmask, which limits control over the height and profile of the resulting nanocones 340.

Figure 4:
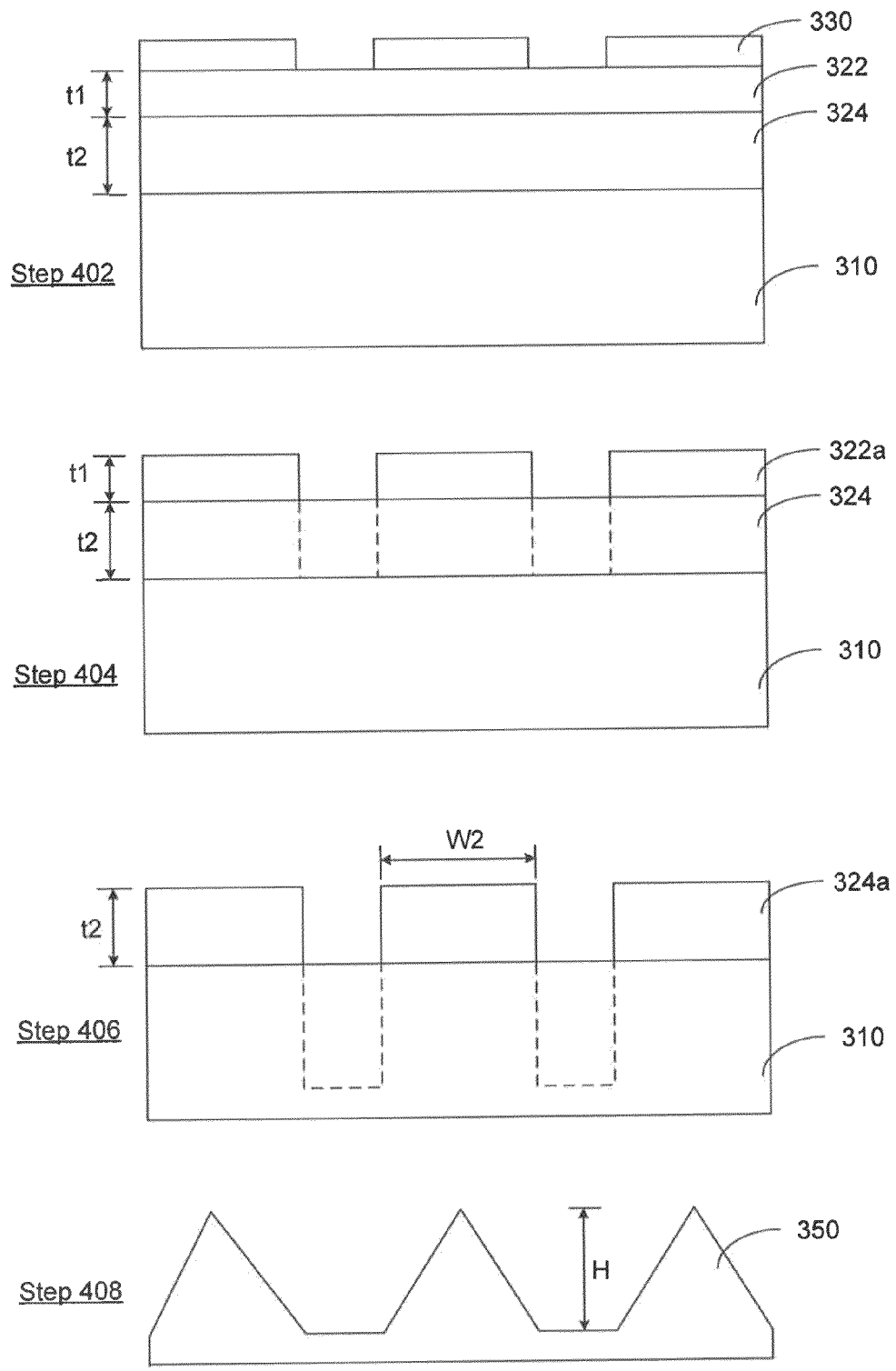
FIG. 4 schematically illustrates an etching process using two hardmasks, in accordance with an embodiment of the present teachings.

To address this limitation, a multiple shrinking mask (MSM) etching process is used, as shown in FIG. 4. Since the MSM process is based on standard plasma etching, it is compatible to, and can be adapted with, any of the lithographic techniques. As shown in FIG. 4, a second hardmask material 324 is formed on a substrate 310, a first hardmask material 322 is formed on second hardmask material 324, and a photo resist layer 330 is formed on first hardmask material 322.

In Step 402, photo resist layer 330 is patterned with the desired nanoscale pattern. In Step 404, the nanoscale pattern is transferred to first hardmask material 322 with high etch selectivity to the photo resist pattern during the first etching. In Step 406, the first hardmask pattern 322a thus produced is then used to etch through second hardmask material 324 to form second hardmask pattern 324a. In Step 408, second hardmask pattern 324a and substrate 310 are both etched, resulting in the desired nanocone structures 350. The height (H) of the nanocone structures 350 can be tailored and is determined by the etching selectivity between two hardmask materials 322 and 324 and their respective thicknesses, t1 and t2. One feature of second hardmask material 324 is that it is made of a material that can be etched, but at a rate much slower than that of substrate 310. This allows the resulting profile to be tapered. In one embodiment, if second mask material 324 is highly etch resistant, a conventional square wave stud pattern is realized.

Figure 5:
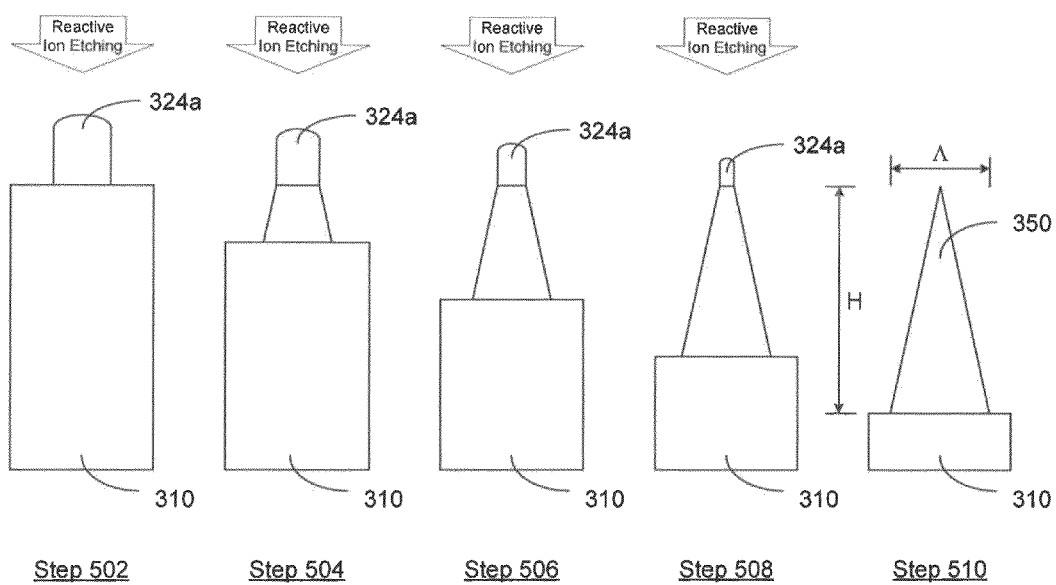
FIG. 5 schematically illustrates the detailed process steps for Step 408 as shown in FIG. 4.

FIG. 5 schematically illustrates the detailed process steps for Step 408 as shown in FIG. 4, to create tapered nanocone structures 350. As shown in FIG. 5, in Step 502, reactive ion etching is performed after second hardmask pattern 324a is formed on substrate 310. In Steps 504, 506, and 508, the reactive ion etching is performed continuously when the tapered nanocone structure 350 gradually forms and when the size of second hardmask pattern 324 gradually reduces. In Step 510, the reactive ion etching is stopped and the tapered nanocone structure 350 is formed when the second hardmask pattern 324 is completely etched off. The aspect ratio of the resulting structure 350 depends not only on the width (W2) of features in second hardmask pattern 324a, but also on the thickness (t2) of second hardmask pattern 324a.

The etching of the underlying substrate material is directional and, at the same time, second hardmask 324a is shrinking. This shrinking mask covers the tip of the forming nanocone structure 350 and determines its slope until the moment that it is fully removed. Thus, the width. W2 and thickness t2 of second hardmask 324a determine the aspect ratio WA of the overall nanocone structure 350. If greater height H is desirable, the etch process can be repeated by using the tapered profile to etch into another material. One advantage of the multiple shrinking mask etching is that high aspect ratio silica nanocone structures can be obtained from successive reactive ion etching (RIE) steps and by changing the layer thickness.

Figure 6:
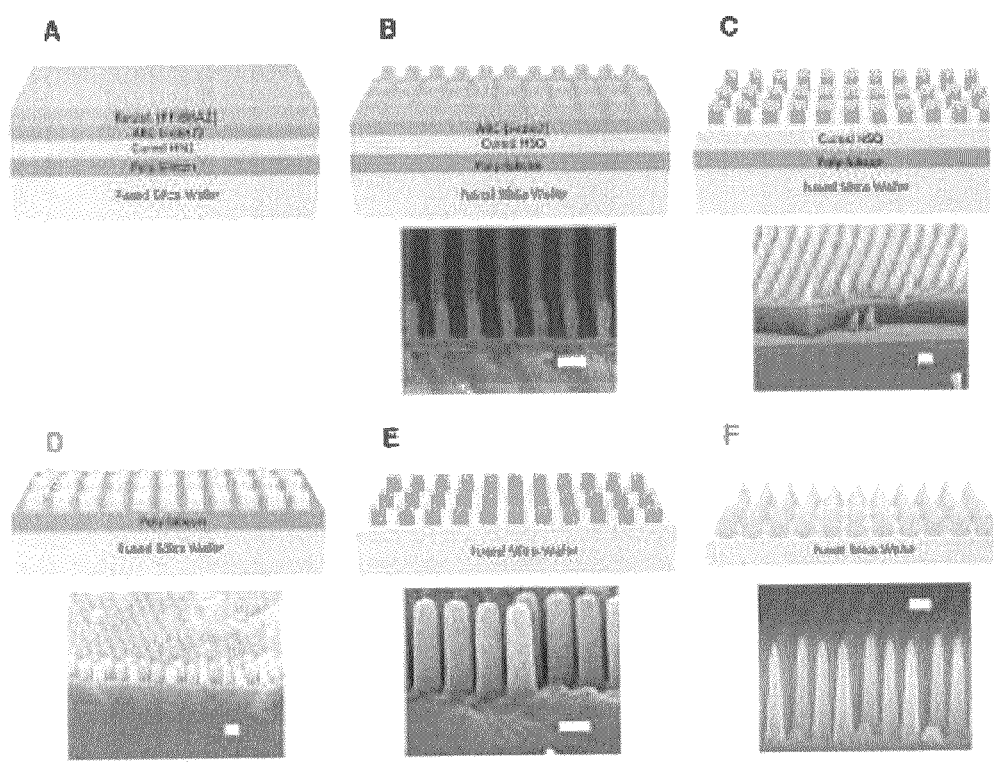
FIG. 6 illustrates a process for fabricating a nanocone structure, in accordance with an embodiment of the present teachings.

The complete fabrication process for the master is shown in FIG. 6. A MLC is first created on top of a fused silica wafer. The coat consists of a positive photoresist layer, an anti reflective coating (ARC) layer, a cured hydrogen silsequioxane (HSQ14, Dow Corning) layer, and a silicon layer that is the shrinking mask layer.

The thickness of each layer is optimized for interference lithography, which determines the period of the nanocone by controlling the incident angle. Two orthogonal laser exposures are projected onto the photoresist by using an interference lithography setup and the exposed photoresist is developed to leave a pattern of posts, as shown in FIG. 6(B). Oxygen $O_2$ and fluoroform $CHF_3$ reactive ion etching processes are then used to transfer the pattern of posts to the ARC layer and HSQ layer, and to open the silicon surface in FIG. 6(B-C). The cured HSQ post, the first hardmask, survives as shown in FIG. 6(D). This HSQ pattern is transferred without defect to the amorphous silicon layer, the second hardmask, with HBr reactive ion etching (FIG. 6(E)). The pattern of silicon posts is finally transferred to the fused silica substrates while the second mask is shrinking with CHF3 RIE, and the process is continued till all the silicon is etched (FIG. 6(F)). Thus, the different etch rates of the hardmasks and fused silica, and the thickness of the silicon layer, enable realization of the high aspect ratio nanocones.

Nanoimprinting process to create GRIN structures from master template.

The large area periodic array of nanocone structures created in fused silica as described above is used as a master template to create "inverted nanocone" or "nanocone" arrays using a UV replication process. The sequence of steps needed to create inverted nanocone structures is shown in FIG. 7A.

First, the mold 730 is placed in contact with and pressurized into a liquid poly urethane acrylate (PUA) prepolymer layer 720 on a glass substrate 710 (or scintillator surface). The PUA 720 is then cured using 4.5 mW/cm², 365 nm UV light 740 and the mold 730 is carefully detached from the PUA surface. In order to enhance the adhesion between imprinted PUA 720 and the substrate 710, silane-type adhesion promoter layer 715 may be used. This process inversely replicates nanocone arrays into the PUA surface to create the textured surface with nanohole arrays 750.

In order to create nanocone structures, the replicated nanohole arrays may be subjected to an additional imprint step. Here, anti-adhesion layer (not shown) with PDMS may be coated on the PUA nanohole mold surface 750 to prevent adhesion between two PUA layers. To completely fill the nanoholes with PUA prepolymer, vacuum assisted filling may be used when the nanohole arrays are pressed into the liquid polymer. The nanostructures thus created are shown in FIG. 7B.

Optically transparent high index media for creating GRIN's.

In addition to being transparent for scintillation photons, the media in which the matching nanostructures are created should have the highest possible refractive index. The higher the difference in refractive indices between the bulk material used for the nanostructures and the index of the detector window, the better the light coupling. Windows on detectors like PMTs have a refractive index of 1.5. Therefore, the bulk material for the nanostructures comprises a high refractive index polymer having a refractive index in the range of about 1.7 to 2.3. Below Table 1 provides a listing of commercially available, high index UV curable polymers, which may be used for the GRINs,

TABLE 1

| No. | Polymer | Refractive Index (RI) |
| --- | --- | --- |
| 1 | Addison Clear Wave AC L2060 | 1.62 |
| 2 | Poly(1-naphthyl methacrylate) | 1.64 |
| 3 | Polyimidothioethers | 1.68 |
| 4 | Poly(pentabromobenzyl methacrylate) | 1.71 |
| 5 | Polycarbodiimide | 1.76 |
| 6 | Polymer-titania nanocomposites | 1.81 |

3. Grin Design Optimized for Blue-UV Transmission

GRIN structures inherently enhance transmission over a very broad hand of incident wavelengths as opposed to PhCs, which are effective primarily for the wavelength they are designed for, and show relatively modest enhancements in the surrounding band. Since tuning of the nanostructured coupling face for a given scintillator can only be achieved when the angular and wavelength distribution of the incident scintillation photons is taken into account as a whole, GRIN structures offer significant advantages over PhCs. Nonetheless, the light diffraction properties of both at a fixed wavelength are governed by 1) the RI of the bulk crystal, 2) the RI of the medium in which they axe implemented, 3) the lattice constant a, and 4) the aspect ratio and their overall fill factor. These parameters need to be optimized for each of the materials identified above. Due to the large fraction of scintillation photons with $\theta_i > \theta_{tot}$, these parameter combinations can optimize the LCE, where transmission (t) is sufficiently large for this angular range. Since the majority of scintillators of interest, such as LaBr3:Ce, CeBr3, and CLYC, emit in blue-UV range, the RI of various materials over the anticipated emission range is considered during design optimization.

4. Ensuring Uniformity of Nanostructure Over Large Area

The nano-lithography and UV replication processes described above inherently create structures with uniformity on a nano-scale over large areas. However, to ensure uniformity several techniques can be employed. These techniques include scanning electron microscopy (SEM) of specimens from different regions of the GRIN, measurements of transmission and reflection spectra over a wide range of photon incidence angles and photon wavelengths, and quantification of mechanical strength using finite element method (FEM). If non-uniformities are observed, these data provide necessary feedback into the fabrication steps to eliminate the issues.

5. Coupling of the Index-Matching Structures to the Scintillator Crystal

One advantage of the UV replication processes for creating GRIN structures of the present teachings is that large area structures can be fabricated in a film form. The film can then be glued to the scintillation crystal, coupled using a high index grease, or applied using pressure coupling. The method of coupling depends on the nature of the scintillator (such as sensitivity to moisture and/or chemicals used in glue) and observed gain in its performance. Each of the coupling options has trade-offs and risks associated therewith.

High RI optical grease may be used in coupling scintillators to photodetectors. The disadvantage of this method in the case of GRIN may be the introduction of an additional, relatively low index medium between the scintillator and the GRIN. This medium may modify modes of light propagation and cause light loss. The same issues may arise if an adhesive is used to glue GRIN to the scintillator.

Pressure coupling is an easy alternative, which allows coupling and decoupling without affecting the crystal. In particular for GRIN, pressure coupling may be used, provided the GRIN has enough mechanical strength to tolerate shear forces during coupling. As pointed out earlier, one of our goals is to create GRIN structures with high mechanical strength. Simulations using the finite element method (FEM) demonstrate that the inverted nanocone structure can effectively handle such forces and may prove to be an excellent choice.

One possible coupling approach is to nanoimprint GRIN patterns on the scintillator surface in a high index medium. Scintillators that are unaffected by organic solvents in the polymer processing, such as BGO, LSO, and LYSO, may be processed in this manner. While such coupling option offers the benefit of not having an intermediate layer between the scintillator and the GRIN, with resultant higher gains in performance, the method may be expensive unless large numbers of identical crystals are processed. Thus, various methods of GRIN coupling can be used depending on the design parameters, so as to ascertain the one that produces efficient coupling, is simple to implement, and is cost effective.

6. Characterization of Impedance Matching

Scanning electron microscopy (SEM) is used to verify the pattern geometry in various GRINs samples. Samples from different regions in a large GRIN are imaged to ensure uniformity over large area. SEM data can reveal the shape of nanocones/nanoholes, aspect ratio, and periodicity in patterns. These data may be quantified and used as feedback to optimize the etching processes described earlier.

Measurements of transmission spectra for various GRIM are carried out using a Cari-500 spectrophotometer in the visible to near infrared range of 300 nm<$\lambda$<1300 nm. First, transmission spectra for both nanocone and inverted nanocone structures under normal incidence are measured and compared to those obtained using conventional photodetector glass windows. Additionally, optical transmission as a function of angle of incidence for GRIN patterns from 0° to 70° with transverse electric (TE) polarized irradiation at various wavelengths are measured and compared to the theoretical estimates. These data may be used to modify the pattern designs and/or fabrication process so as to maximize the GRIN transmission.

Angular distribution of the light from scintillator with and without the GRIN is measured to estimate GRIN efficiency. The scintillator is mounted on a computer controlled rotating stage and scintillation from the crystal is measured using a stationary photodiode. To generate enough light, the crystal is excited using a 365 nm UV LEDs to produce characteristic emissions of the scintillator. The crystal is rotated with respect to the photodiode, and the angular distribution from X and Y directions of the crystal is measured. These data may be used to estimate light distribution over the 2$\pi$ solid angle. The ratio of the integrated light over 2$\pi$ solid angle from the GRIN, and the reference crystal without the GRIN, determine the gain in LCE.

Light yield measurements are performed by coupling the unstructured reference crystal to a R6233-100 Super Bialkali PMT and exposing it to 662 keV $\gamma$-rays from a 137Cs source. Measurements are repeated by coupling identical scintillators with various GRIM mounted on the exit surface. In all cases, energy spectra are measured. The relative LY gain is calculated as the ratio between the LY with the GRIN to that without the GRIN. These data may also be useful to judge gain in energy resolution. One important variant during these experiments is methods of coupling GRINs to the scintillator and to quantify their effect on measured LY.

Improvements in temporal resolution is judged by analyzing scintillation time profiles for 137Cs $\gamma$-rays in crystals with and without the GRIN structures. Time profiles are collected using a PMT (Hamamatsu R6233-100 Super Bialkali) and CAEN DT5720 digitizer. The traces are analyzed by custom software to decipher rise time differences and estimate gain in speed. Conventional co-incidence spectroscopy is used to estimate gains in temporal resolution.

Simulations and experimental results are compared, and the difference in these data may be used to judge pattern structure imperfections and/or light absorption in media in which GRINs are created. These findings form a significant metric and provide definitive means to improve the fabrication process to bridge gaps between theoretical and experimental results.

The present teachings provide a photonic crystal nanostructure having high-aspect ratio gradient-index (GRIN) and a method for fabricating the photonic crystal nanostructure. The photonic crystal nanostructure of the present teachings allows extraction of scintillation light with unprecedented efficiency. Nanostructure designs are tailored for specific emission wavelengths, and are directly fabricated on scintillator surfaces or produced in a film form over large areas (5 to 10 cm on a side), using an economical nanoimprinting technique. The GRIN structure includes nanocones and/or inverted nanocones. Experiments show that the photonic crystal nanostructure of the present teachings can achieve a 35% gain in light collection efficiency from a scintillator using 2×2 mm² photonic crystals.

Although these teachings have been described with respect to various embodiments, it should be realized these teachings are also capable of a wide variety of further and other embodiments within the spirit and scope of the appended claims.

What is claimed is:

1. A radiation sensor, comprising:
   a photo detector;
   a scintillator on the photo detector; and
   an adiabatic gradient-index photonic crystal nanostructure between the scintillator and the photo detector.

2. The radiation sensor of claim 1, wherein the adiabatic gradient index lens structure comprises an impedance matching nanostructure.

3. The method of claim 1, wherein the adiabatic gradient-index photonic crystal nanostructure comprises tapered structures.

4. The method of claim 3, wherein the tapered structures comprise nanocones.

5. A method for fabricating a radiation sensor, comprising:
   fabricating a scintillator having an adiabatic gradient-index photonic crystal nanostructure; and
   combining the scintillator with a photodetector, the adiabatic gradient-index photonic crystal nanostructure of the scintillator facing the photodetector;
   wherein fabricating a scintillator comprises:
      providing a scintillator substrate comprising a substrate, a first hardmask layer on the substrate, a second hardmask layer on the first hardmask layer, and a photoresist layer on the second hardmask material;
      patterning the photoresist layer to form a nanoscale pattern;
      etching the first hardmask layer using the nanoscale pattern of the photoresist layer to form a first hardmask pattern;
      etching the second hardmask layer using the first hardmask pattern to form a second hardmask pattern; and
      simultaneously etching the second hardmask pattern and the substrate to form the adiabatic gradient-index photonic crystal nanostructure on the substrate.

6. The method of claim 5, wherein an etching rate of the second hardmask pattern is substantially slower than that of the substrate.

7. The method of claim 5, wherein the adiabatic gradient-index photonic crystal nanostructure comprises tapered structures.

8. The method of claim 7, wherein the tapered structures comprise nanocones.

* * * * *